Dec. 30, 1952 W. ALTAR 2,623,993

AMPLITUDE MODULATOR WITH DOUBLE YIELD

Filed Sept. 12, 1950

WITNESSES:
H. F. Susser.
M. W. Dodd

INVENTOR
William Altar.
BY F. E. Browder
ATTORNEY

Patented Dec. 30, 1952 2,623,993

UNITED STATES PATENT OFFICE 2,623,993

AMPLITUDE MODULATOR WITH DOUBLE YIELD

William Altar, Pittsburgh, Pa., assignor to Westinghouse Electric Corporation, East Pittsburgh, Pa., a corporation of Pennsylvania Application September 12, 1950, Serial No. 184,487

4 Claims. (Cl. 250—17)

Figure 1:
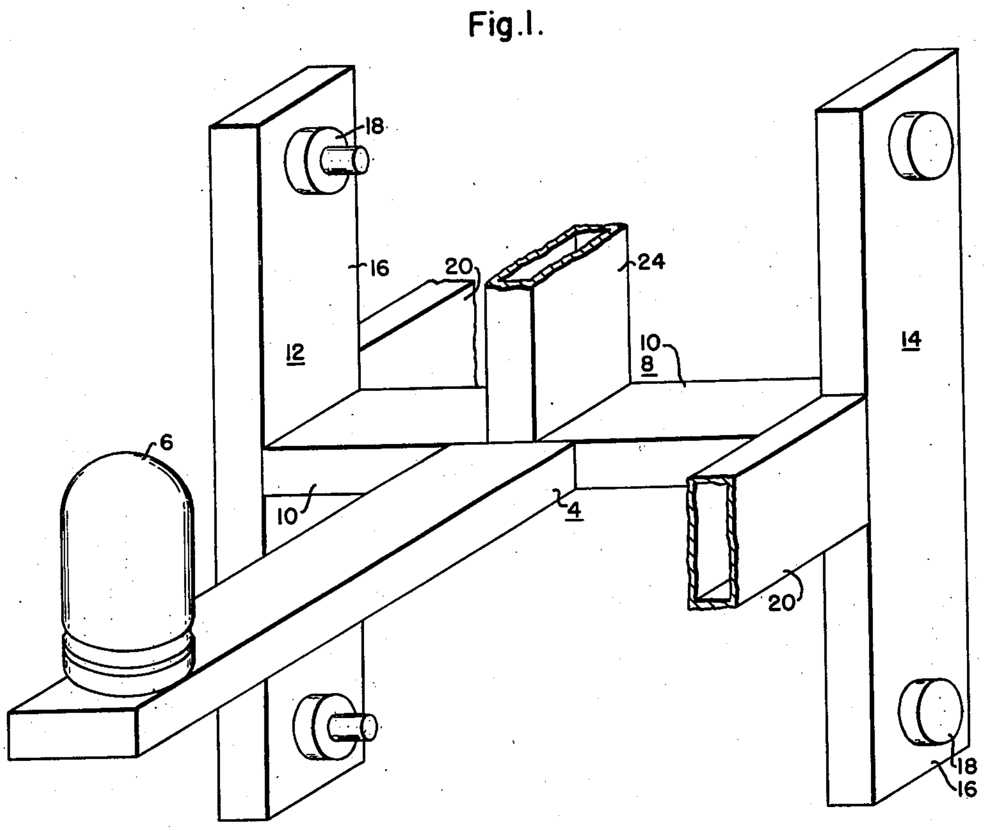

My invention relates to amplitude modulation and more particularly to amplitude modulation of oscillations in the microwave frequency range.

In accordance with the teachings of the prior art of which I am aware, modulation of such oscillations may be effected by the application of a modulation voltage to a reflector, an accelerating grid or any other electrode of an oscillator tube, such as a klystron or magnetron. A disadvantage of modulation of this type is that undesirable frequency modulation results. Another disadvantage lies in the sluggishness of the modulated output in failing to follow with fidelity modulating voltages having high frequency components such as are encountered in television and frequency modulation broadcast systems.

Modulation of microwave oscillations may also be effected by coupling a non-linear resistance element, such as a crystal, to an oscillator so that it absorbs the oscillations. The modulating voltage is impressed on the element to vary its resistance. A disadvantage of this scheme is that the radio frequency energy absorbed by a crystal or similar device is limited, and therefore the modulated power output which can be derived by this expedient is limited.

To overcome these difficulties, amplitude modulators have been built employing systems of hybrid junctions, such as are shown in the copending application Serial No. 13,473, filed March 6, 1948, of Raymond T. Gabler and William Altar, now Patent No. 2,545,994 issued March 20, 1951, and the copending application Serial No. 54,746, filed October 15, 1948, of William Altar and Theodore Miller. These devices modulate the oscillations entering them by removing therefrom a portion of the energy in accordance with a signal applied to the modulation apparatus. The original oscillations which are thus modulated are then transmitted and the energy removed from the original oscillations in the modulation process is normally absorbed in a non-reflecting load and thereby wasted. The failure to employ this energy is undesirable.

It is, accordingly, an object of my invention to provide a more efficient apparatus for producing amplitude modulation of high power oscillations of high frequencies with substantially no accompanying frequency modulation.

Another object of my invention is to provide apparatus for the amplitude modulation of microwaves wherein the energy removed from the oscillations entering thereinto is utilized.

In accordance with our invention, I provide apparatus in which the modulation is effected by the cooperation of wave guides joined to form one or more hybrid junctions, whereby part of the energy of the oscillations entering the modulation apparatus is removed from those oscillations. The then modulated oscillations are fed out through a main output conductor to transmitting or other apparatus for utilizing the energy of those oscillations. The energy removed from the primary oscillations in the modulation process is caused to pass through another conductor to another transmitting apparatus. The primary modulated oscillations are thus kept separate from the secondary modulated oscillations which represent the energy derived from the primary oscillations in the modulating process. If the frequency of the primary oscillations employed is sufficiently high, as, for example, in the microwave frequency range, they will be directional, and when transmitted with directional antennae the primary modulated oscillations can be kept entirely separate from the secondary modulated oscillations which were obtained as a by-product in the modulation process. The amplitude of the secondary oscillations will vary oppositely to the amplitude of the primary oscillations. In other words the amplitude of the primary oscillations is at a maximum when a minimum of energy has been removed from those oscillations in the modulation process, while the amplitude of the seconday oscillations which represent the energy removed from the primary oscillations by the modulation apparatus will be at a maximum when the energy removed from the primary oscillations by the modulation apparatus is at a maximum. For most purposes such as voice transmission this does not make a substantial difference. In those cases where the fact that the secondary modulations vary oppositely to the primary oscillations and the receiving apparatus which is tuned to receive the primary oscillations would not produce an intelligible signal if it were to receive the secondary oscillations, a receiver can be built which would receive the secondary oscillations and obtain therefrom an intangible signal. This may be achieved by including in that receiving apparatus, means for inverting the amplitude of the signal, i. e. of producing a response the amplitude of which is at a maximum, when the amplitude of the received signal is at a minimum.

Figure 2:
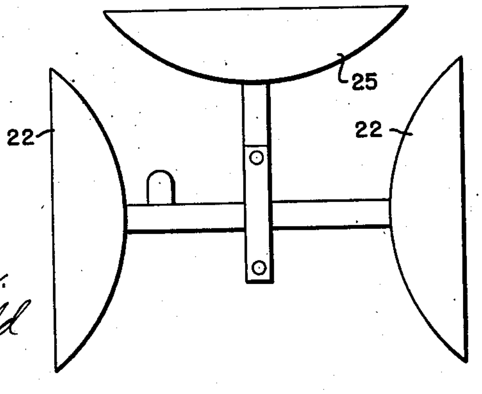

The novel features which I consider characteristic of my invention are set forth with more particularity in the appended claims. The invention, however, with respect to both the organization and the operation thereof, together with other objects and advantages may be best understood from the following description of specific embodiments when read in connection with the accompanying drawing, in which:

Figure 1 is a schematic showing in perspective of an embodiment of my invention, and Fig. 2 is a schematic showing of apparatus embodying my invention wherein directional antennae are shown attached to the apparatus of Fig. 1.

The embodiment of my invention shown in the drawing comprises three systems of wave guides, of rectangular tranverse cross-section, which are coupled together in what is known in the art as hybrid junctions or magic T's. At one end, an input wave guide 4 is connected to a source of oscillations 6, such as a high power klystron, magnetron or resnatron. At the other end, the input wave guide 4 is connected through a main magic T junction 8 to a pair of conjugate branches 10. These conjugate branches are at right-angles to the input wave guide 4 and their sides of greatest area are parallel to the corresponding sides of the input wave guide. Connected to the ends of the conjugate wave guides 10 opposite to the main magic T junction 8, through second and third magic T's 12 and 14 respectively, are pairs of conjugate impedance wave guides 16. The sides of greatest area of the impedance wave guides 16 are parallel to the corresponding sides of said conjugate wave guides 10. These impedance wave guides 16 have coupled thereto, at their ends, variable impedances 18 to vary the impedance of the wave guides in accordance with the modulation to be impressed. In the preferred practice of our invention, reactance tubes are used for this purpose.

Also connected to each of the conjugate wave guides 10 through the second and third magic T's 12 and 14, is a secondary output branch 20 connected to a load such as an antenna 22. The secondary output branches 20 are perpendicular to the conjugate wave guides 10 and the impedance wave guides 16. The second magic T junction 12 is one-quarter wave length or an odd integral multiple quarter wave length further, as measured along the corresponding conjugate wave guides 10, from the electrical center of the main magic T 8 than is the third magic T 14.

Connected to the input wave guide 4 and the conjugate wave guides 10 through the main magic T 8, is primary output wave guide 24 from which a load such as antenna 25, may be supplied. The primary output wave guide 24 is perpendicular to the other wave guides entering the junction, and the long dimension of its cross-section is parallel to the length of the input wave guide.

Oscillating energy from the source 6 flows through input wave guide 4 to the main magic T junction 8. On reaching this junction, the energy is deflected to the right and left toward the second and third magic T junctions 12, 14. On reaching the junction of the second T 14, the energy is deflected into the two impedance wave guides 16. The oscillations are reflected entirely from these impedance wave guides back toward the junction of the second magic T 14. The phase of these reflected waves will depend on the phase of the modulating potential applied to the variable impedances 18 in these impedance wave guides. The signal potential is applied to the impedances in the impedance wave guides 16 so as to cause the impedance of one impedance wave guide 16 to become more inductive while the impedance of the other impedance wave guide becomes more capacitive. This will result in a change in phase of the reflected waves. Thus, when the two waves meet at the junction of the second magic T, they will have a component in phase and a component out of phase. That component of the reflected waves which is in phase will be deflected toward the secondary output antenna 22. The rest of the energy of the oscillations will be deflected toward the main magic T. As the apparatus is symmetrical except for the quarter-wave difference in length as measured along the two conjugate wave guides 10 connected to the main T 8, the action of the third T 14 will be the same as the second T 12 except that the oscillations arriving from the second T will have traveled one-quarter wave length further than the oscillations from the third T. The oscillations returning to the main T will thus be substantially out of phase by 180°. As these oscillations are out of phase by 180°, and as the primary output wave guide presents a matched load to the potentials of the T junction, substantially all of the energy returning from the second and third T's is deflected out the primary output wave guide and none of the energy is deflected back through the input wave guide toward the source of oscillations where it would produce undesirable frequency modulation.

Substantially all of the energy which enters the input wave guide to the first magic T is emitted by the three antennae. This relationship may be expressed as $$P=P_1+P_2+P_3+C$$

where P is the power entering the input branch of the first magic T; $P_1$, $P_2$, and $P_3$ represent the power emerging from the antennae connected to the first, second and third magic T's respectively; and C represents the power lost in the system. From this equation it can be seen that if P and C remain substantially constant then as $P_1$ increases, the quantity $(P_2+P_3)$ decreases. Since, in the apparatus employed in this embodiment of my invention, $P_2$ is equal to $P_3$, as $P_1$ increases both $P_2$ and $P_3$ decrease. The signals emitted by the secondary antennae are therefore not identical to the signal emitted from the primary.

If the signals from the three antennae are allowed to commingle so that the power of the resulting oscillations is equal to the sum of the powers of the oscillations emitted from the three antennae, the result would be an unmodulated train of oscillations like those produced by the oscillator originally. It is therefore necessary that these waves be kept separate. This can be achieved quite easily when employing microwaves because of their highly directional nature by merely radiating each of the signals in a different direction.

It has been pointed out that the signals emitted by the secondary antennae 22 are different from the signal emitted from the primary antenna 25 in that when the primary antenna signal has a maximum amplitude, the secondary antenna signals have minimum amplitudes. Although this will not make a substantial difference in most cases, nevertheless in some cases it may be desirable to employ a different type of receiving apparatus to receive the signals emitted by the secondary antenna from that which is employed to receive the signal emitted by the primary antenna. The difference in receivers may be merely the inclusion of an amplitude inverter in the circuit of the receiver for the secondary antenna signals. By amplitude inverter I mean a circuit apparatus capable of receiving a signal and producing in response thereto a signal which has its maximum amplitude at the place, in the train of waves constituting that signal, where the received signal has a minimum amplitude.

In most situations where such amplitude inversion is desirable it may be achieved by merely changing the polarity in the transformer to which the rectified signal in the receiver is applied.

Although I have shown and described specific embodiments of my invention, I am aware that other modifications thereof are possible. My invention, therefore, is not to be restricted except insofar as is necessitated by the prior art and the spirit of the invention.

I claim as my invention:

1. In combination, a source of high frequency electromagnetic oscillations, modulating apparatus connected to said source for removing part of the energy of said oscillations produced by said source, a primary conductor connected to said modulating apparatus in such manner as to receive said modulated oscillations, a secondary conductor connected to said modulating apparatus in such manner as to receive the energy removed from said oscillations by said modulating apparatus, an antenna for transmitting oscillations conveyed by said primary conductor and a second antenna for transmitting oscillations conveyed by said secondary conductor in such a manner that oscillations transmitted by said second antenna do not interfere with the oscillations transmitted by said primary antenna.

2. In combination, a first magic T having four branches, a source of oscillations connected to a first of said branches, a second magic T connected to a second of said branches and a third magic T connected to a third of said branches, said second magic T being one-quarter wave length further from the junction of said first magic T than is said third magic T, said second and said third magic T's having variable impedances on two of their branches and transmitting apparatus connected to the third branches of said second and said third magic T's, and a second transmitting apparatus connected to a fourth branch of said first magic T.

3. In combination, a first hybrid junction having four conductive paths, a source of oscillations connected to a first of said conductive paths, a second hybrid junction connected to a second of said conductive paths and a third hybrid junction connected to a third of said conductive paths, said second hybrid junction being one-quarter wave length further from the junction of said first hybrid junction than is said third hybrid junction, said second and said third hyrid junctions having variable impedances on two of their conductive paths and a transmitting apparatus connected to a third conductive path of said second and said third hybrid junctions, a fourth conductive path connected to said first hybrid junction containing a load for deriving the net energy produced therefrom.

4. As an article of manufacture, a first hybrid junction including an input wave guide, an output wave guide and a pair of conjugate wave guides, a second hybrid junction coupled to one of said conjugate wave guides and a third hybrid junction coupled to the other of said conjugate wave guides, said conjugate wave guides each constituting the input wave guide of its corresponding hybrid junction and said second and third wave guides each having in addition output wave guides and conjugate wave guides, the output wave guides of said second and third wave guides having connected thereto antennae.

WILLIAM ALTAR.

REFERENCES CITED

The following references are of record in the file of this patent:

UNITED STATES PATENTS

| Number | Name | Date |
|---|---|---|
| 2,223,058 | Christ | Nov. 26, 1940 |
| 2,295,351 | Luck | Sept. 8, 1942 |
| 2,468,237 | Sanders et al. | Apr. 26, 1949 |
| 2,484,256 | Vaughn | Oct. 11, 1949 |
| 2,496,521 | Dicke | Feb. 7, 1950 |